Jan. 3, 1967 W. B. WILKINS 3,296,055
APPARATUS FOR APPLICATION OF REINFORCING STRANDS
TO A COMPARTMENTED NEST
Filed June 5, 1963 6 Sheets-Sheet 1

INVENTOR
WILLIAM BURDETTE WILKINS

BY
ATTORNEYS.

INVENTOR
WILLIAM BURDETTE WILKINS

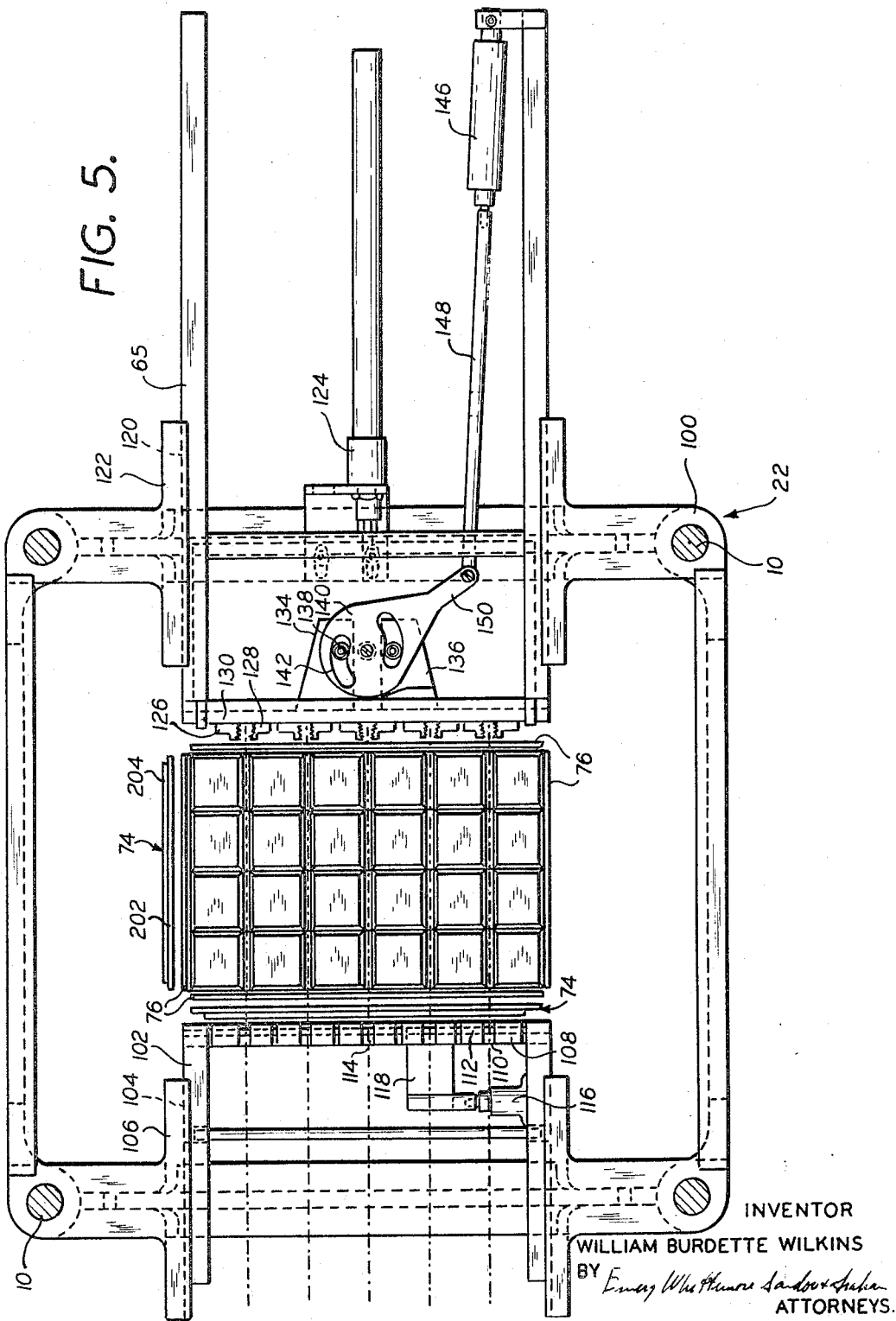

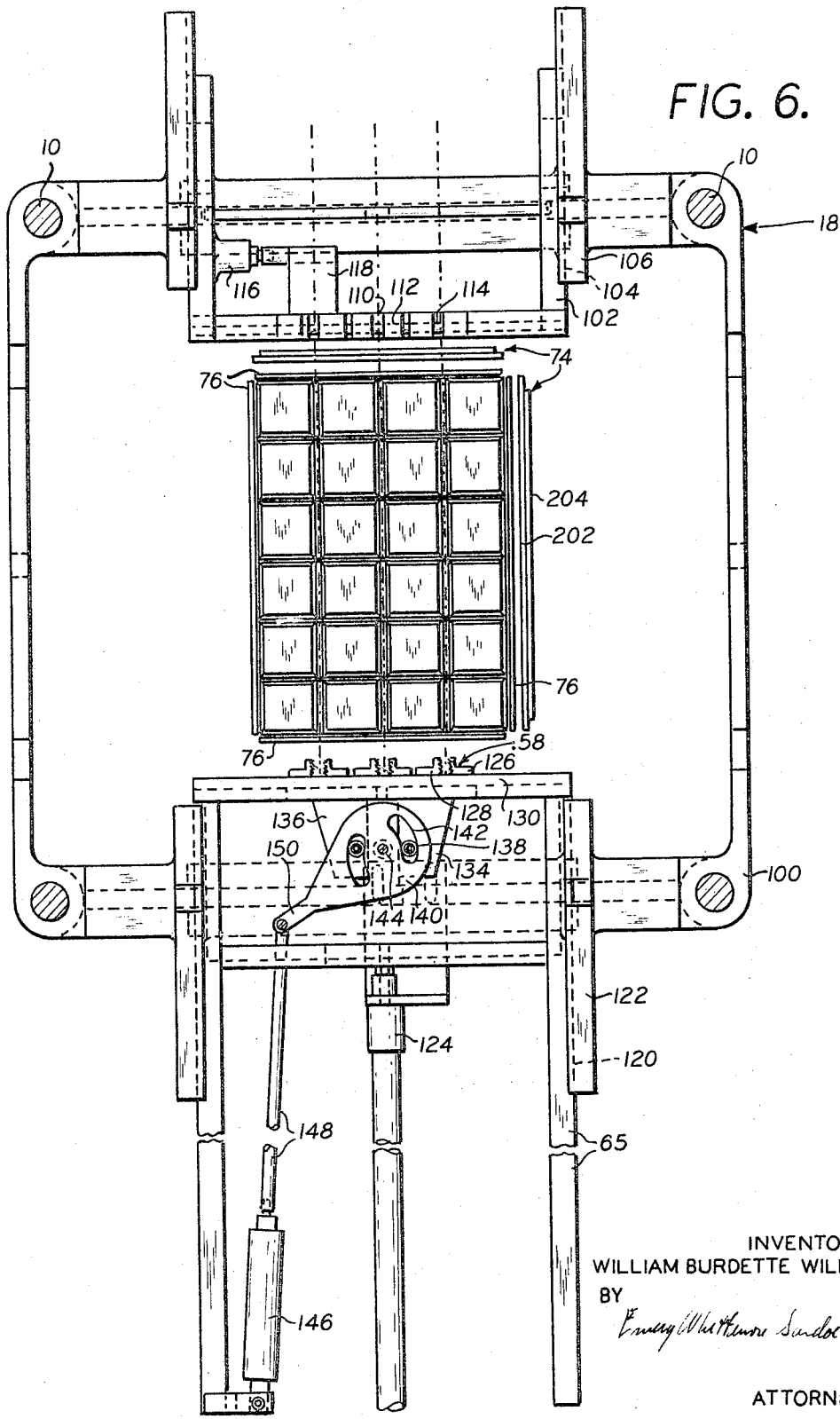

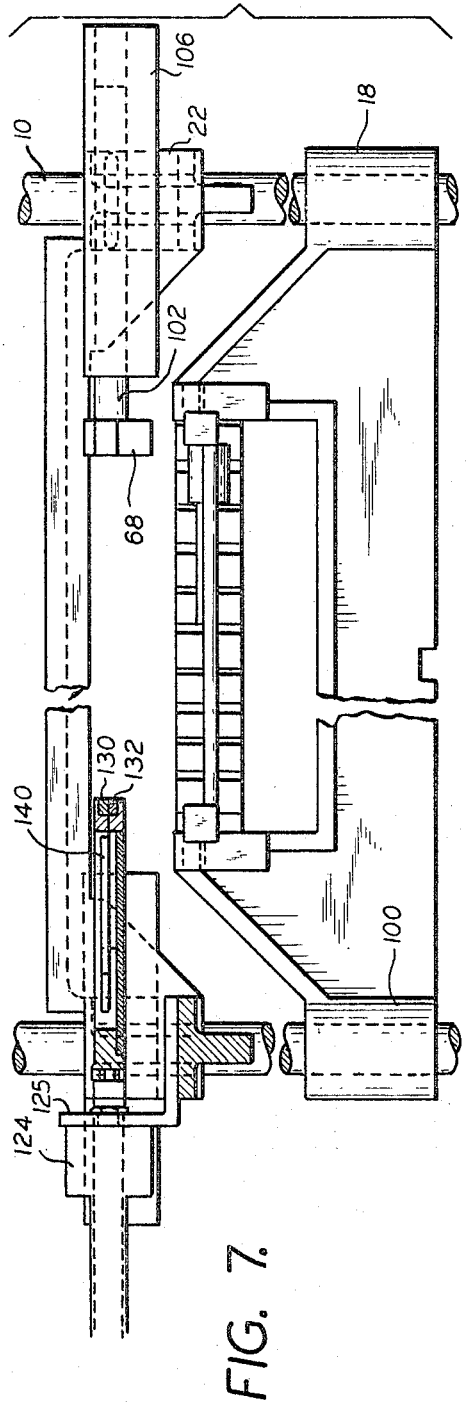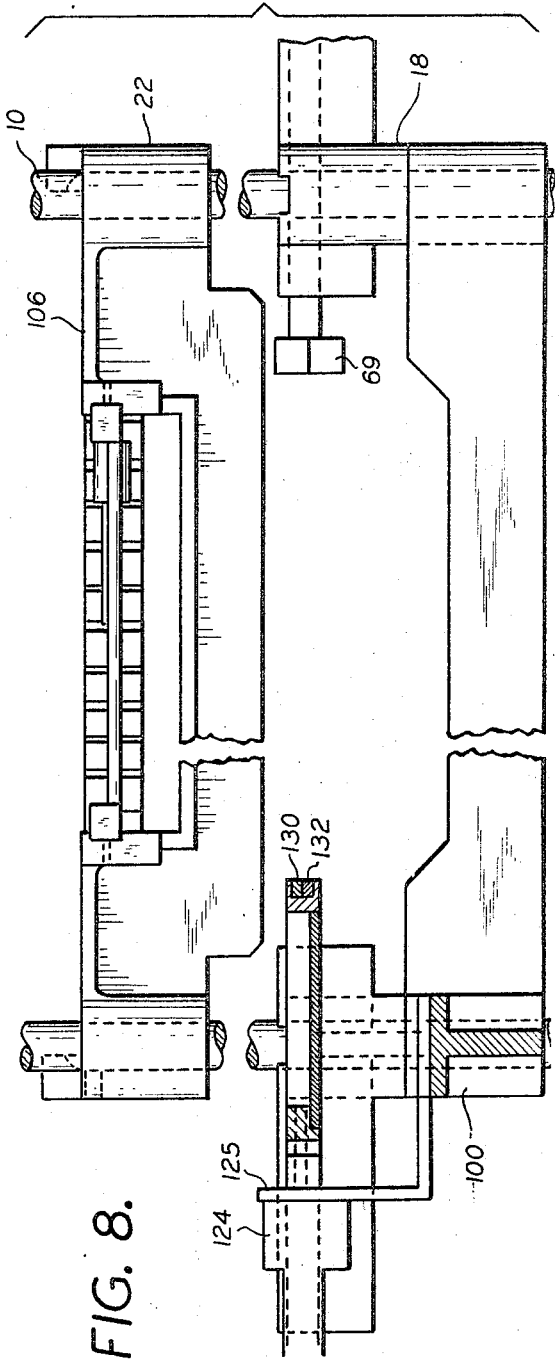

Jan. 3, 1967  W. B. WILKINS  3,296,055
APPARATUS FOR APPLICATION OF REINFORCING STRANDS
TO A COMPARTMENTED NEST
Filed June 5, 1963  6 Sheets-Sheet 6
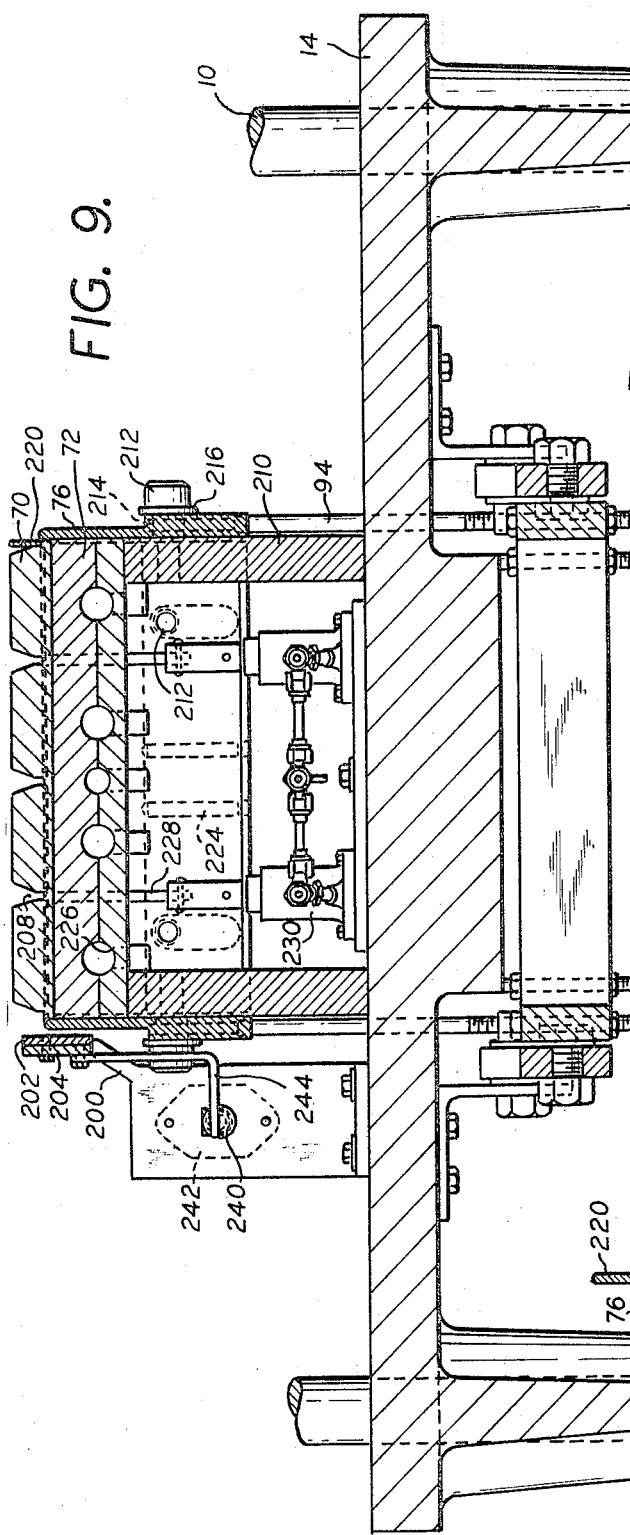
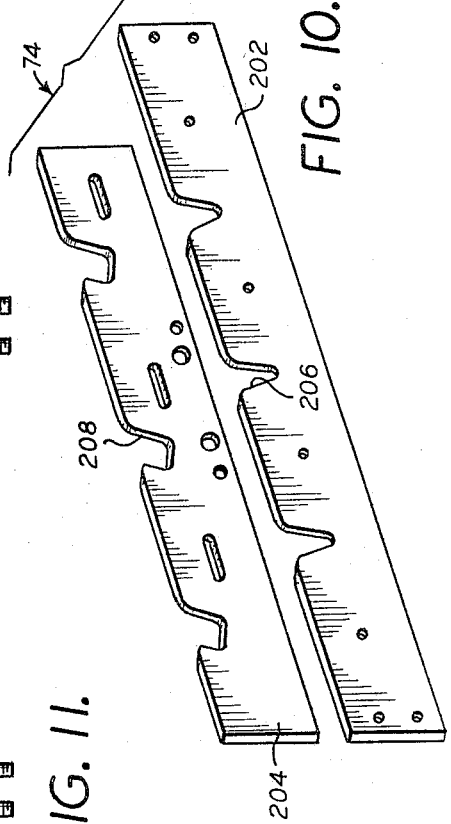
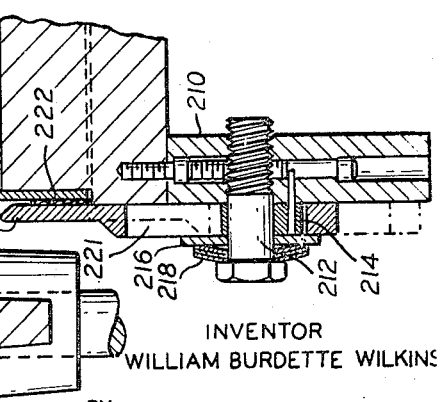
INVENTOR
WILLIAM BURDETTE WILKINS
BY
ATTORNEYS.

United States Patent Office 3,296,055
Patented Jan. 3, 1967

3,296,055
APPARATUS FOR APPLICATION OF REINFORCING STRANDS TO A COMPARTMENTED NEST
William Burdette Wilkins, Roxboro, N.C., assignor to Reinforced Plastic Container Corporation, Roxboro, N.C.
Filed June 5, 1963, Ser. No. 285,762
10 Claims. (Cl. 156—433)

This invention relates to the construction of partitioned structures, such as nests, and, more particularly, relates to apparatus for the application of reinforcing roving to the top and bottom edges of selected partitions forming said nests in precise and economical manner.

Bottled commodities as, for example, soft drinks are commonly sold and transported in crates. These crates contain a partitioned structure of regular configuration, usually termed a nest. Each compartment of the nest accommodates a single bottle. The partition between adjacent bottles must be sufficiently strong so as to prevent contact between adjacent bottles, with resultant damage, during such transport. For many years, the nests had been formed of thin wooden partitions which are notched at the intersections to permit fitting together of the partitions to form the nest. Unfortunately, this construction suffers from the drawback that the notched partition strength is reduced to essentially the cross grain strength of the wood at the notch. Sections of the partition often break off and fall into the nest compartments. The partition does not properly separate the bottles and the broken sections in the compartments prevent insertion of bottles during loading, to the full insertion depth. The protruding bottles are then broken as the crate is moved out of the loader necessitating stoppage of the automatic loading equipment until the apparatus is cleared and cleaned.

In addition, wooden partitions are subject to warpage in use rendering it difficult to maintain an accurate control of dimensions of the nest.

For this reason, there has been developed nest structures fabricated from laminated material such as paper bonded together in a nest having a plurality of similarly sized compartments. For example, the nests illustrated in my U.S. Patent No. 3,036,726 and my application Serial No. 285,374, filed June 4, 1963, for Actuated Mold and Ejector are suitable for such applications.

During use of crates employing such nests to transport filled bottles, such as soft drinks, the nest structure will provide the necessary resiliency to prevent contact between adjacent bottles and damage thereto. However, it is common for the transporters of crates of loaded bottles to pick up the crate by grasping one of the bottles and lifting the entire crate. Thus, the entire loaded weight of the crate and contents is thrown on a single partition, and, to provide the necessary physical strength to tolerate such loading, the strength of the partition walls must be increased over that necessary for its function as a separator. Making the partition walls thick enough to sustain this loading is wasteful of material and space. However, the necessary strength can be provided by bonding high strength roving material to the edges of the individual partitions at the top and bottom of the partitions. For example, fiber glass roving bonded to the edges by means of a thermosetting resin provides the necessary bond strength and reinforcement of the strength of the partition walls.

In addition to overall strength, the application of roving to the edges of the nests protects the edges of the partition during loading of the crate thereby extending the useful life time of such crates.

It is desirable that the roving application be selectably controlled in order to strengthen only those partitions subject to major stresses without requiring that all partitions be strengthened. The selective bonding of roving is usually preferred at the bottom of the nest since it is usually found necessary to apply roving to the top of all partitions in the nest.

Obviously, the bonding of roving to the tops of thin partitions as, for example, partition walls .070 to .125 of an inch thick in manner compatible with required production rates and the necesesary production economy precludes rudimentary techniques such as hand lay-up of the roving on the individual partitions and activating the bond in a press or mold.

It is, therefore, an object of the present invention to provide an improved apparatus for the rapid and economical application of roving to the edges of nest partitions and bonding of said roving thereto.

In accordance with these objects, there is provided, in a preferred embodiment of the present invention, apparatus for the application of roving to the edges of nest partitions which comprises a first and second mold platen. Each platen carries a mold consisting of a plurality of segments, each of which is adapted for insertion into one of the compartments of the nest and to receive therebetween a partition wall.

Means are provided to transport the nest between the mold platens. Between the nest and the first and second mold platens, roving platen means are provided to draw the lengths or strands of resin impregnated fiber glass roving across the nest and aligned with the longitudinal and transverse partition walls.

Means are provided simultaneously to close both mold platens upon the nest picking up the roving strands during closing, thereby to pick up between each mold segment a partition wall and the roving to be bonded to the edge thereof. The molds are moved simultaneously so as to close with the nest locked therebetween. The mold segments are heated thereby to bond the resin impregnated roving strands to the edges of the partitions.

Means simultaneously operable with closure of the mold are provided to cut the roving strands to the necessary lengths, to press the ends of the strands to the side walls of the nest and to bond the strand ends to the sides of the nest thereby to improve the roving reinforcement.

Means are provided then to open the mold and to withdraw the nest therefrom.

Having briefly described this invention, it will be described in greater detail along with other objects and advantages thereof in the following detailed portions of the specification, which may best be understood by reference to the accompanying drawings, of which:

FIG. 5 is a plan view of the transverse roving mold platen;

FIG. 6 is a plan view of the longitudinal roving mold platen;

FIG. 7 is a partially sectioned side view of the longitudinal and transverse mold platens taken along one axis of the machine;

FIG. 8 is a partially sectioned side view of the platens shown in FIG. 7 taken along an axis perpendicular to that of FIG. 7;

FIG. 9 is a sectioned view of the mold platen and equipment mounted on the mold platen;

FIG. 10 is a perspective view of the roving cutter bars to enlarge scale; and

FIG. 11 is a partially sectioned view of the mold and wiper blades to enlarged scale.

Figure 1:
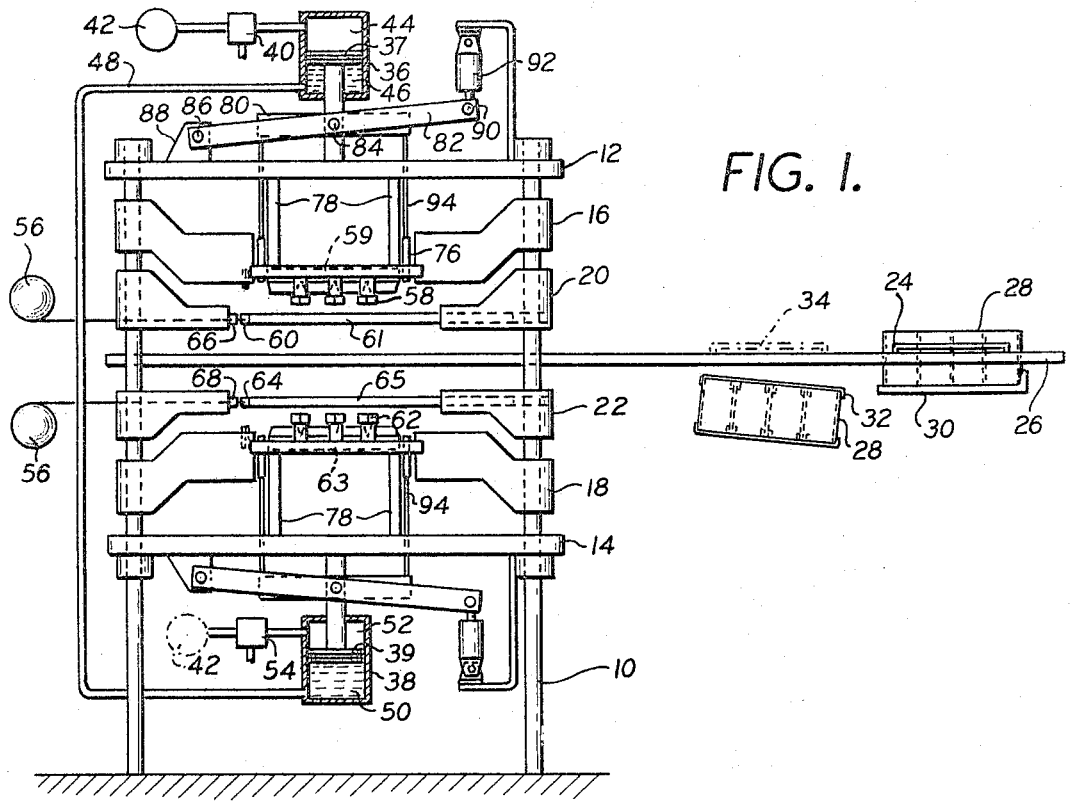
FIGS. 1–4 are elevation views of the apparatus in accordance with the present invention partially in schematic form and in various stages of cycling of the apparatus for the purposes of illustrating and explaining the operation thereof.

Referring first to FIGS. 1–4 which shows the apparatus in accordance with this invention in various operating positions, partially in schematic form to facilitate explanation. The apparatus comprises a frame consisting of vertically extending corner posts 10 upon which are slidably mounted an upper mold platen 12, a lower mold platen 14, an upper longitudinally roving platen 16, a lower longitudinally roving platen 18, an upper transverse roving platen 20 and a lower transverse roving platen 22. Nest clamps 24 are slidably mounted on nest transfer tracks 26 and are operable to grip the nest 28 and selectively driven to transport the nest from hopper 30 into the mold. After completion of the application of the roving 32 to the edges of the partitions forming nest 28, the clamps 24 withdraw the nest and open at the position illustrated in dotted outline 34 to drop the finished nest into a discharge receptacle (not shown). The travelling nest clamps then move to pick up a new nest from hopper 30.

The mold platens 12 and 14 are driven by the respective hydraulic rams 36 and 38 to close the molds on the nest inserted therebetween. As the mold platens 12 and 14 travel, they pick up and transport the roving platens 16, 20 and 18, 22 respectively. The upper platens 16 and 20 are positioned as shown by springs supporting the platens in the rest positions shown and enabling movement of the platens when the mold closes. The lower platens 18 and 22 are positioned by stops on the frame which define the rest positions as shown, but permit platen movement when picked up by the lower mold platen 14.

In order to effect mold closure by simultaneous and equal movement of platens 12 and 14, the cylinder 36 within which piston 37 operates is provided with an inlet coupling through electrically operated 3-way valve 40 to a source of compressed air. When valve 40 is actuated, compressed air is introduced into the cylinder space 44 above the piston. The space 46 below the piston is filled with hydraulic fluid and is coupled through line 48 to the cylinder 38 so that the fluid enters into space 50 behind the piston. The air in space 52 below the piston is exhausted to atmosphere through electrically operated 3-way valve 54. Thus, as compressed air is introduced into the upper ram, downward displacement of piston 39 ensuring that the molds move together. By this means, closure on the nest is simply and positively controlled. Reversal for opening is effected by reversing the 3-way air valves in conventional manner. The spring suspension of the upper platens and the weight of the lower platens aids in opening. Spools 56 of roving are provided for each partition in the nest. The roving may, for example, comprise bundled glass fibers preimpregnated with a thermosetting bonding resin such as a polyester resin. Such form is convenient since resin applicators at each spool are then unnecessary. In order to draw the roving and to position the roving above the partitions above the crate, there are provided pull clamps 58, 60, 62 and 64 respectively mounted on frames 59, 61, 63 and 65 on the respective platens 16, 18, 20 and 22. Cutter clamps 66 and 68 are respectively provided on platens 20 and 22. Similarly, cutter clamps 69 (FIG. 8) are provided on the platens 16 and 18, but are not shown in the views of FIGS. 1–4.

OPERATION

Initially, the apparatus is positioned as shown in FIG. 1 with the nest 28 in hopper 30, pull clamp frames 59, 61, 63 and 65 extended, and cutter clamps 66, 68, 69 closed to hold the roving strands.

Figure 2:
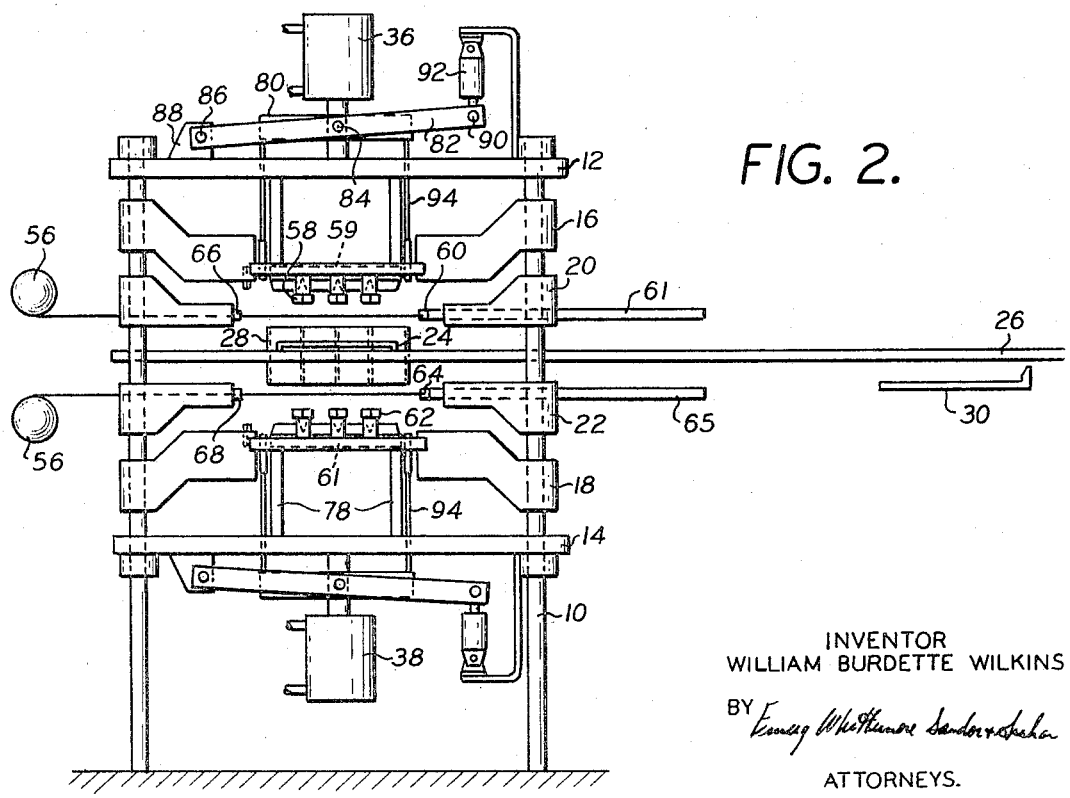
Figure 3:
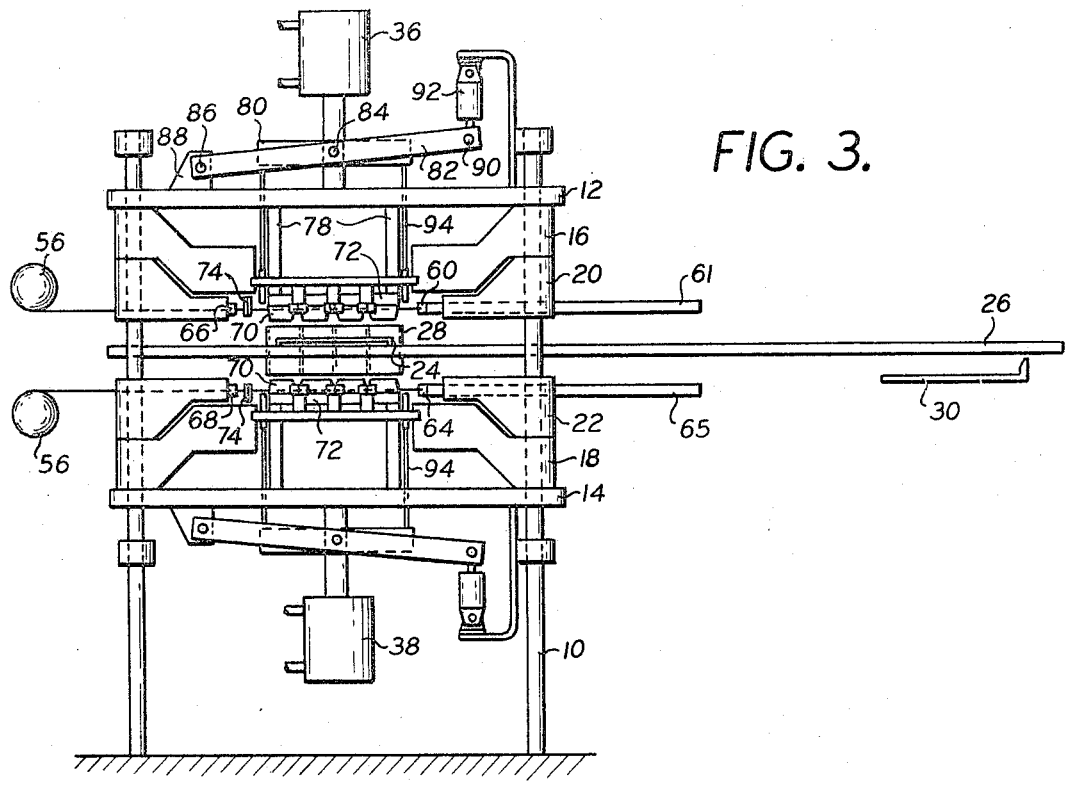

The nest clamps 24 are actuated to clamp the nest 28. Then, the pull clamps 58, 60, 62 and 64 are closed to clamp the ends of roving strands held by the cutter clamps. The cutter clamps are then opened. These operations are performed by a clock timer having a plurality of cam discs driven by the timer. As the lobe on each disc reaches the operating position, it closes an electric circuit to energize a conventional electrically operated valve which when energized couples a pneumatic or hydraulic source to an operating ram thereby to effect the movement required. The specifics of ram operation are set forth hereinafter. The clock timer and piping are conventional and are omitted to avoid obscuring the inventive aspects of the illustrated mechanisms. The nest 28 is then transferred into the mold as is shown in FIG. 2 and the pull clamp frames 59, 61, 63 and 65 are retracted to draw the roving strands across the mold positioning each strand above a respective partition in the nest. The stationary cutter clamps 66, 68, 69 are then closed on the roving thereby to hold the roving in the predetermined position above the respective partitions. Ram 36 and its follower ram 38 is then energized to close the mold by moving the mold platens towards the centrally disposed nest. As the mold platens advance, the roving strands will be positioned between the protruding segments 70 of the mold proper 72, thus, ensuring proper alignment of the roving strands. During mold closure, the mold platens will pick up and move the respective roving platens 16, 20 and 18, 22 by interaction of the frames when the respective roving strands are positioned at the bottom of the slots between adjacent segments 70 of the mold. Cutters 74 are provided on each mold platen, the jaws of which are opened to slide over the respective roving strands adjacent the cutter clamps 66, 68 and 69. Thus, as the mold platen travels, the roving strands aligned with the longitudinal partitions will first be positioned at the bottom of the slots between segments 70 of mold 72. The mold platen will then pick up the longitudinal roving platens 16 and 18 and the mold and longitudinal roving platens will move together ensuring that the positioning of the roving strands in the mold 72 is maintained. Subsequently, the transverse roving strands are positioned in the slots of mold 72 and the platens 20, 22 picked up by the mold platen. Thus, before the mold closes on the nest, the roving strands are properly positioned in the mold as shown in FIG. 3.

Figure 4:
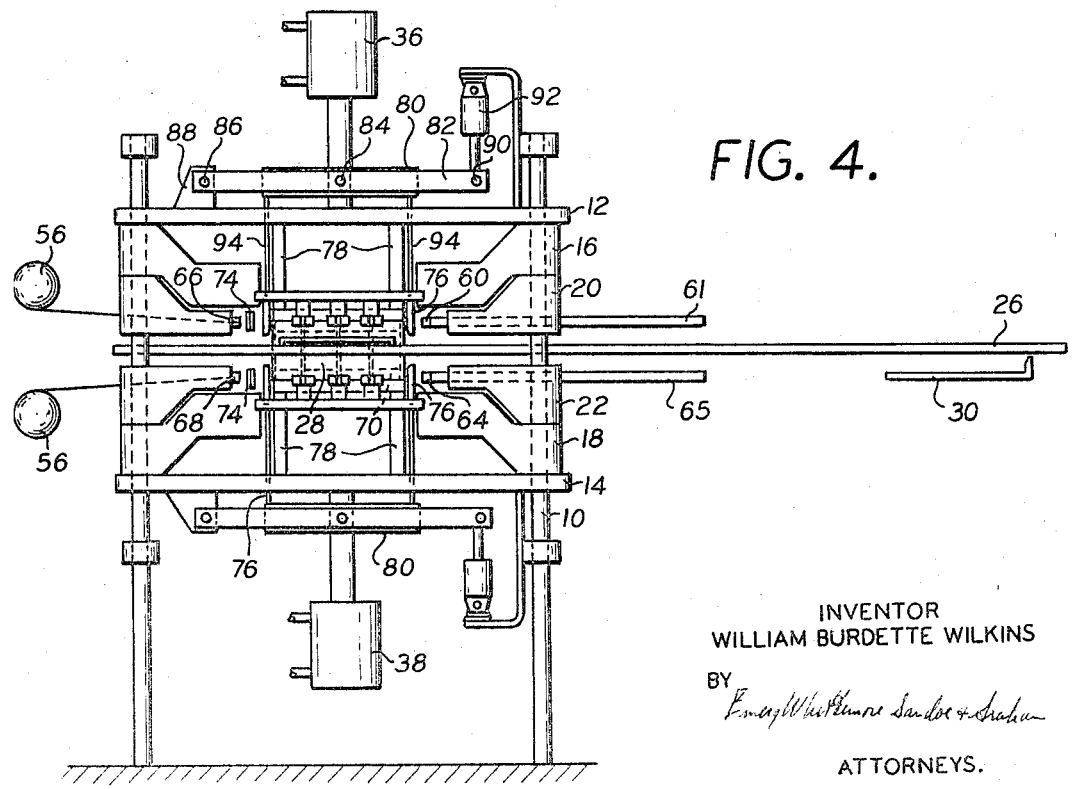

As shown in FIG. 4, as the mold platens continue to advance the mold closes on the nest 28 and each partition thereof falls into the slot between adjacent mold segments 70. The truncated pyramidal shape of each segment ensures that the partition walls will be properly aligned. Any deviation of the partition wall is picked up and cured by the entry of the segment into the compartment. Thus, the roving strands are now positioned over each partition and as the mold closes, the roving is pressed onto the corresponding partition wall.

Since the roving is now held by the mold, the travelling pull clamps 58, 60, 62 and 64 are opened and the cutters 74 operated to cut the roving, leaving a short end protruding from the cutter clamps 66, 68 and 69. The end protruding from the clamps is required for subsequent cycles. The wipers 76 are then actuated, which wipers are positioned on each side of the nest thereby to press the ends of the roving strands along the side of the nest. The wipers 76 and the mold segments 70 are heated thereby actuating the resin bonding the roving strands securely to the nest.

The wiper bars 76 on each side of the mold 72 are slidably carried on the mold frame 78. The wiper bars 76 are coupled, through adjustable link rods 94, to a traveling frame 80 which is coupled to a lever arm 82 by means of freely mounted pins 84. Each lever arm is pivotally coupled by pin 86 to an abutment 88 and is actuated by coupling the free end thereof by pin 90 to a pneumatic ram 92. This articulated linkage permits a single ram 92 to be used for operation of each wiper assembly and provides for parallel motion of the wipers along the outside of the mold.

The mold is held in the closed position for the time necessary for the resin cure. A few nest is placed in hopper 30. The mold is then opened and the wipers retracted. The cured nest is then withdrawn by movement of the clamp 24 along tracks 26. The nest clamps open at the position 34 shown in dotted outline in FIG. 1 to drop the finished nest and continue to the position at the hopper 30 to pick up the new nest. The pull clamp frames are extended, bringing the apparatus to the condition for start of a new cycle identical to that set forth above.

The sequence of operation along with the timing thereof is set forth in Table I to give a typical illustrative example of a practical cycling operation.

Thus, it can be seen that cycling is rapid and the positioning of the roving strands atop the individual partitions is accurately and precisely controlled.

TABLE I

*Step 1.—Nest pickup*

OPERATION

Clock time (from start)

| | |
|---|---|
| Press open. | |
| Nest clamp 24 closes on nest 28 in hopper 30 | 0:00–0:01 |
| Pull clamp frames have been extended, pull clamps 58, 60, 62, 64 close on ends of roving held by cutter clamps 66, 68 and 69 | 0:00–0:02 |
| Cutter clamps 66, 68 and 69 now open | 0:02–0:03 |
| Cutters 74 are open. | |
| Wipers 76 are retracted. | |

*Step 2.—Nest transfer and roving draw-out*

| | |
|---|---|
| Press open. | |
| New nest 28 transferred on track 26 to mold position | 0:01–0:08 |
| Pull clamp frames retract, pulling roving across molds | 0:03–0:07 |
| Cutter clamps 66, 68 and 69 now close on roving | 0:07–0:08 |
| Cutters 74 remain open. | |
| Wipers 76 remain retracted. | |

*Step 3.—Roving alignment*

| | |
|---|---|
| Press is closing, aligning roving in grooves of molds 72 | 0:09–0:12 |
| Nest held by clamp 24 in molding position. | |
| Pull clamps 58, 60, 62, 64 are closed and frames are retracted. | |
| Cutter clamps 66, 68 and 69 remain closed. | |
| Cutters 74 are open, roving slides into cutter slots. | |
| Wipers 76 remain retracted. | |

*Step 4.—Roving cut-off and wipe*

| | |
|---|---|
| Press fully closed, glass roving pressed on nest partions | 0:12 |
| Nest held by clamp 24 in molding position. | |
| Pull clamps 58, 60, 62, 64 open | 0:12–0:13 |
| Cutter clamps 66, 68 and 69 remain closed on roving. | |
| Cutters 74 close and reopen, cutting off roving | 0:12–0:14 |
| Wipers 76 are extended, forcing loose ends of roving against nest | 0:14–0:15 |

*Step 5.—Cure*

| | |
|---|---|
| Press closed on nest. Molds 72 curing glass roving | 0:12–0:47 |
| Nest held by clamp 24 in molding position. | |
| Pull clamps 58, 60, 62, 64 remain open. | |
| Cutter clamps 66, 68 and 69 remain closed, holding roving from spools 56. | |
| Cutters 74 remain open. | |
| Wipers 76 remain extended, curing ends of glass roving | 0:15–0:47 |
| New nest placed in hopper 30 | 0:46 |

*Step 6.—Press opening*

| | |
|---|---|
| Press opens, retracting molds 72 | 0:49–0:52 |
| Finished nest held by clamp 24. | |
| Pull clamps 58, 60, 62, 64 remain open. | |
| Cutter clamps 66, 68 and 69 remain closed, holding roving from spools 56. | |
| Cutters 74 remain open. | |
| Wipers 76 retract | 0:47–0:49 |

*Step 7.—Nest ejection*

| | |
|---|---|
| Press open. | |
| Cured nest withdrawn on track 26, nest clamp 24 opens at ejection point 34 while moving towards hopper 30 | 0:52–0:60 |
| Pull clamp frames extend pull clamps 58, 60, 62, 64 to cutter clamps 66, 68 and 69 | 0:52–0:60 |
| Pull clamps remain open. | |
| Cutter clamps remain closed. | |
| Cutters 74 remain open. | |
| Wipers 76 remain retracted. | |

The details of operation of the platens may be more easily understood by reference to FIGS. 5–8.

In FIG. 5, there is shown a plan view of the platen 22 which comprises a frame assembly 100 slidably mounted on the corner posts 10. The stationary clamp assembly comprises a frame 102 which is adjustably positioned within the tracks 104 in the formed webs 106 of frame 100 and is fixedly held in the desired position therein. The clamps consist of stationary jaws 108 held on a mounting bar 110. Moving jaws 112 are mounted on a sliding bar 114 actuated by a pneumatic cylinder 116 through the linkage 118. The pneumatic cylinder is controlled by an electrically operated valve and is sequenced in accordance with the time schedule in Table I from a conventional clock timer.

The pull clamp frame 65 is slidably mounted within tracks 120 in the formed webs 122 of frame 100 and is driven laterally by the pneumatic ram 124. The pull clamps consist of separated first jaw elements 126 and second jaw elements 128 mounted respectively on the traveller bars 130 and 132 (FIG. 7). The upper most bar 130 is coupled to one arm 134, the lower most bar is coupled to arm 136. Each arm is provided with a pin 138 extending through the cam slots 142 cut in plate 140 and having an eccentric path as plate 140 rotates about its axis 144. Rotation of the cam plate is actuated by a pneumatic ram 146 through the coupling of the lever 148 and the plate extension 150. The ram 146 is actuated through an electrically operated valve sequenced as set forth in Table I by a clock timer.

The longitudinal roving platen 18 is constructed in similar fashion as shown in FIG. 6 with, however, the stationary and the moving jaws transposed 90° with respect to the nest and mold assembly thereby to enable pulling of the roving strands across the longitudinally extending partitions. Since the construction and operation is similar to that of FIG. 5, detailed explanation is omitted. While only three moving jaws 58 and stationary jaws are shown for the specific nest illustrated, it will be obvious from the symmetry of the drawings, that the platens provide space for mounting of additional roving pull clamps. For example, five jaws as shown in FIG. 5 can be mounted if it is desired to apply roving to square nests.

The platens 18 and 22 must be so constructed so as to fit one within the other as the mold closes so that the roving strands, both longitudinal and transverse, are positioned in the same plane when the roving platens are picked up by the moving mold platens. The construction details are shown in FIGURES 7 and 8 taken respectively along perpendicular axes to show such detail.

The upper platens in the mold are of like construction and details thereof are not repeated. To adjust the roving strand application to the specific application, matching cutter clamp and draw clamp jaws are preferably screw-mounted enabling removal of selected jaws, thereby to provide for selective drawing of roving across the partition walls. For example, in some applications, it is unnecessary to provide roving strands on the top and bottom of each partition. For example, in the nest for soft drinks, it is desirably to apply reinforcing roving strands to the top of each partition wall, but to provide roving strands at the bottom only where the strength augmentation is necessary. In the mold assemblies shown, this can be simply and efficiently provided for merely by removal of the jaws associated with the partition requiring no roving reinforcement.

The details of the mold platens and equipment mounted thereon are best shown in FIGURES 9–11 in which there is shown the mold platen 14. The mold 72 is mounted on the platen by means of a strong mold frame 210. The mold 72 is provided with segments 70 which define slots 208 therebetween to receive the roving strands and the individual nest partition walls 220.

The roving cutters 74 consist of a stationary cutter bar 202 secured to cutter mounting frames 200 at each end thereof. A movable cutter bar is slidably mounted in contact with the stationary bar and is reciprocally driven with respect thereto by ram 242 to the piston rod 240 of which the sliding cutter bar 204 is coupled by bracket linkage 244. In the rest position, the V-shaped slots 206 in the stationary cutter bar and the angled rectangular slots 208 in the stationary cutter bar are aligned to define an unobstructed V-shaped opening to receive the strands of roving as the mold platen is closed on the nest. When it is desired to cut the roving as indicated in Table I, the ram 242 is energized, driving the moving cutter bar across the stationary bar to sever the strands.

The wiper blades 76 are coupled to the mold frame 210 by bolt 212 threadably engaged into the frame 210. The bolt extends through slot in wiper blade and holds blade against the side of the mold by spring washer 216. When the mold 72 is closed on the nest 28, the end wall 220 thereof peripherally surrounds the mold segments 72 and the wipers 76 are driven upwardly from the position shown in dotted outline 221 to wipe the ends of the roving strands 222 up against outside of the end walls. The drive mechanism has been set forth in connection with FIGURES 1–4. The wipers 76 are heated in conventional manner, as by electric heater elements 224 enclosed therein, to bond the resin impregnated end of the roving against the peripheral wall of the nest. In this manner, the roving strands are neatly terminated and are solidly anchored by bonding to the side walls of the nest. Similarly, electric heater elements 226 are mounted in the mold to heat the mold.

To eject the molded assembly, ejector rods 228 and associated pneumatic rams 230 are provided. By selective operation of the rams, the nest can be ejected from the mold.

This invention may be variously modified and embodied within the scope of the subjoined claims.

What is claimed is:

1. Apparatus for the application of roving to the edges of the walls of a fabricated nest having longitudinal and transversely extending partitions, comprising a first mold platen and a second mold platen, each of said mold platens having a mold mounted thereon, each of said molds having a plurality of upstanding segments to fit within the compartments of said nest and to define slots therebetween to receive the partitions of said nest, means to move said nest between said mold platens, roving platens positioned between said nest and said first and second mold platens to draw roving strands over a selected plurality of said partitions, means to close said mold by simultaneous movement of said first and second mold platens into engagement with said nest in which position said mold segments are inserted into the nest compartments and in which position the roving and partition walls are received by said slots in said mold assembly, and to hold said mold closed to bond said roving to said partitions, means for heating said mold to cure said bond, means to open said mold after said cure, and means to withdraw said nest with said roving bonded to the selected plurality of partitions.

2. Apparatus in accordance with claim 1 in which said mold moving means comprises a first cylinder having a piston mounted threin, means coupling said piston to said first mold, a second cylinder having second piston operable therein, means coupling said second piston to said second mold platen, each of said cylinders having an inlet port at one end thereof and an outlet port at the other end thereof, means coupling the inlet port of one of said cylinders to a source of air under pressure, by fluid coupling means connecting the outlet port of said first cylinder to the inlet port of said second cylinder to effect simultaneous and equal movements of the pistons in said first and second cylinders when coupled to air.

3. Apparatus in accordance with claim 1 in which said means for positioning said roving above said nest comprises a first and second roving platen mounted between said nest and said first mold platen, and a third and fourth roving platen mounted between said nest and said second mold platen, each of said first and fourth mold platens comprising stationary cutter jaws to hold strands of said roving and selectively operated movable pull clamps to travel across said platen to grip the ends of said roving strands gripped by said stationary jaws, and to draw said roving strands from said stationary jaws across said platen to position strands of roving along the longitudinal partitions of said nest, each of said second third roving platens comprising stationary cutter jaws to hold strands of said roving and selectively operated moving pull clamps to travel across said platen to grip the ends of said roving strands gripped by said stationary jaws, and to draw said roving strands from said stationary jaws across said platen.

4. Apparatus in accordance with claim 1 which includes cutter bars mounted on said mold platens to engage said roving strands as the mold closes and to cut said roving strands into lengths positioned across the partitions of said nest.

5. Apparatus in accordance with claim 4 which includes wiper bars positioned about the periphery of said mold, means for heating said wiper bars said wiper bars being mounted in a frame and means coupled to said frame for simultaneous movement of the bars positioned about said mold upwardly to wipe the ends of said cut roving strands against the side walls of said partition to bond said ends thereto.

6. Apparatus in accordance with claim 1 in which said means for nest movement comprises a nest transfer track extending between said first and second mold platen, a clamp movable along said track, said clamp dimensioned to engage said nest in transporting relationship and to move said nest into said mold for the application of roving thereto and to transport said nest out of said mold at the termination of roving application.

7. Apparatus in accordance with claim 3 in which said mold platens and said roving platens are slidably mounted on a common frame, means for positioning the platens in spaced apart relationship when the mold is open, and in which the mold platen, during closure of the mold, will contact and can move said roving platens.

8. Apparatus in accordance with claim 3 in which said roving platen comprises a fixed cutter clamp mounting frame, a draw clamp mounting frame slidably mounted within said platen frame, selectively operable means to drive said sliding from a rest position to an operable position in proximate engagement with said stationary jaws, pull clamps mounted on said sliding frame, said clamps comprising a first set of jaw clamps mounted on a first bar member, a second set of stationary jaw clamps mounted on a second bar member, and cam means selectively energizable to reciprocate said bar members thereby to open and close said pull clamps.

9. Apparatus in accordance with claim 1 in which each of said first and second mold platens comprise a mold mounting frame secured to said platen, said mold being mounted on said mold mounting frame, a wiper blade positioned on each side of said mold, each of said wiper blades being slidably mounted to said mold mounting frame, said mold and wiper blades being provided with heater elements, ejector pins extending through said mold, means for driving said ejector pins to eject the nest in said mold.

10. Apparatus in accordance with claim 9 in which said driving means comprises a pneumatic ram.

No references cited.

EARL M. BERGERT, *Primary Examiner.*

J. P. MELOCHE, *Assistant Examiner.*